United States Patent
Yu

(10) Patent No.: US 9,068,618 B2
(45) Date of Patent: Jun. 30, 2015

(54) PISTON ASSEMBLY OF SHOCK ABSORBER

(71) Applicant: MANDO CORPORATION, Pyeongtaek-si, Gyeonggi-do (KR)

(72) Inventor: Chun Sung Yu, Iksan-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 83 days.

(21) Appl. No.: 13/917,418

(22) Filed: Jun. 13, 2013

(65) Prior Publication Data

US 2013/0333993 A1    Dec. 19, 2013

(30) Foreign Application Priority Data

Jun. 13, 2012 (KR) .................. 10-2012-0062976

(51) Int. Cl.
*F16F 9/32* (2006.01)
*F16F 9/348* (2006.01)

(52) U.S. Cl.
CPC ............... *F16F 9/3214* (2013.01); *F16F 9/348* (2013.01)

(58) Field of Classification Search
CPC ............. F16F 9/49; F16F 9/348; F16F 9/512; F16F 9/516; F16F 9/0227; F16F 9/3214; F16F 9/3228; F16F 9/3242; F16F 9/3405; F16F 9/3485; F16F 9/5126; F04B 7/00

USPC .................. 188/322.22, 322.15, 322.13, 316, 188/282.1, 282.6, 317, 312; 92/108
See application file for complete search history.

(56) References Cited

U.S. PATENT DOCUMENTS

| | | | | | |
|---|---|---|---|---|---|
| 2,327,295 | A | * | 8/1943 | Whisler, Jr. ................... | 188/280 |
| 5,115,892 | A | * | 5/1992 | Yamaoka et al. .......... | 188/282.5 |
| 5,293,971 | A | * | 3/1994 | Kanari et al. ............... | 188/282.1 |
| 5,332,069 | A | * | 7/1994 | Murakami ................. | 188/282.6 |
| 5,404,973 | A | * | 4/1995 | Katoh et al. ................ | 188/282.1 |
| 5,497,862 | A | * | 3/1996 | Hoya .......................... | 188/282.5 |
| 6,276,498 | B1 | * | 8/2001 | Kirchner .................... | 188/282.5 |
| 6,460,664 | B1 | * | 10/2002 | Steed et al. .............. | 188/322.15 |
| 7,611,000 | B2 | * | 11/2009 | Naito .......................... | 188/282.3 |
| 2003/0132073 | A1 | * | 7/2003 | Nakadate ................... | 188/282.2 |
| 2008/0121478 | A1 | * | 5/2008 | Maniowski et al. ....... | 188/282.6 |
| 2009/0301831 | A1 | * | 12/2009 | Bombrys et al. ......... | 188/322.15 |

* cited by examiner

*Primary Examiner* — Anna Momper
*Assistant Examiner* — San Aung
(74) *Attorney, Agent, or Firm* — McDermott Will & Emery LLP

(57) ABSTRACT

A piston assembly of a shock absorber is provided. A compression retainer and a rebound retainer are disposed above and under a piston body. A blow-off reducing unit is disposed between the compression retainer and an auxiliary valve and on a bottom surface of the auxiliary valve to form a plurality of blow-off points, so that a rapid variation in a damping force can be considerably reduced even in a low-speed and middle-speed transition period.

8 Claims, 3 Drawing Sheets

PISTON ASSEMBLY OF SHOCK ABSORBER

CROSS-REFERENCE(S) TO RELATED APPLICATION

This application claims priority of Korean Patent Application No. 10-2012-0062976, filed on Jun. 13, 2012, in the Korean Intellectual Property Office, the contents of which are incorporated herein by reference in its entirety.

BACKGROUND OF THE INVENTION

1. Field of the Invention

The present invention relates to a piston assembly of a shock absorber, and more particularly, to a piston assembly of a shock absorber which can easily control a damping force in a low-speed and middle-speed transition period.

2. Description of the Related Art

Generally, a shock absorber is designed to support a weight of a vehicle body and suppress and dampen a vibration transferred from a road surface to the vehicle body, contributing to improving a ride comfort and protecting loaded goods and various parts of a vehicle.

Such a shock absorber includes a cylinder filled with a working fluid (oil), a reciprocating piston rod connected to a vehicle body, and a piston valve connected to a lower end of the piston rod to slide within the cylinder and control a flow of the working fluid.

Herein, the term "blow-off point" as used herein refers to a point at which a two-dimensional damping force characteristic in a low-speed driving period meets a one-dimensional damping force characteristic in a middle-speed driving period. At the blow-off point, a rapid variation occurs in the damping force. Hence, the blow-off point is one of factors that degrade a ride comfort and give a passenger an unpleasant feeling.

The blow-off may be reduced by generating one blow-off point at two positions. However, this method has limitations in generating soft and smooth damping force characteristics in a low-speed and middle-speed transition period.

CITATION LIST

Patent Literature (Patent Literature 1) Korean Patent Application No. 10-1994-0004413
(Patent Literature 2) Korean Patent Application No. 10-2010-0088353
(Patent Literature 3) Korean Patent Application No. 10-2011-7009436

SUMMARY OF THE INVENTION

The present invention has been made in an effort to solve the above problems, and provides a piston assembly of a shock absorber which can easily control a damping force in a low-speed and middle-speed transition period.

According to an embodiment of the present invention, a piston assembly of a shock absorber includes: a piston body in which a piston rod reciprocating within a cylinder penetrates a central portion thereof, and a compression passage and a rebound passage alternately penetrating the piston body are formed around the piston rod; a compression retainer disposed above the piston body and penetrated by a first coupling hole corresponding to the compression passage; a rebound retainer disposed under the piston body and penetrated by a second coupling hole corresponding to the rebound passage; an auxiliary valve disposed under the rebound retainer and penetrated by a third coupling hole connected from the rebound passage through an outer periphery of the piston rod; and a blow-off reducing unit provided between the rebound retainer and the auxiliary valve and under the auxiliary valve, and configured to form a plurality of blow-off points by opening and closing a main passage, which is formed by mutual communication between the rebound passage and the second coupling hole during rebound and compression strokes, and a bypass passage, which is separated from the main passage and is formed by mutual communication with the third coupling hole connected from the rebound passage through the outer periphery of the piston rod.

The piston assembly may further include: a first rebound disk sheet formed on a bottom surface of the rebound retainer and protruding concentrically around the piston rod along an outside of the second coupling hole, an edge of a first rebound disk being mounted on the first rebound disk sheet; a second rebound disk sheet protruding from an edge of the rebound retainer along an outside of the first rebound disk sheet, an edge of a second rebound disk being mounted on the second rebound disk sheet; and a mounting sheet formed in the rebound retainer, protruding concentrically around the piston rod along an outside of the second coupling hole, and coming into contact with a bottom surface of the piston body, wherein a space formed by an inside of the mounting sheet communicates with the main passage and the bypass passage respectively.

The piston assembly may further include: a first auxiliary disk sheet formed on a bottom surface of the auxiliary valve and protruding concentrically around the piston rod along an outside of the third coupling hole, an edge of a first auxiliary disk being mounted on the first auxiliary disk sheet; a second auxiliary disk sheet protruding from an edge of the auxiliary valve along an outside of the first auxiliary disk sheet, an edge of a second auxiliary disk being mounted on the second auxiliary disk sheet; and an auxiliary mounting sheet formed on a top surface of the auxiliary valve, protruding concentrically around the piston rod along an outside of the third coupling hole, and coming into contact with a bottom surface of a spacer connected to the rebound retainer, wherein a space formed by an inside of the auxiliary mounting sheet communicates with the bypass passage.

The blow-off reducing unit may include: a first blow-off point formed on a bottom surface of the auxiliary valve and formed in a contact portion between a first auxiliary disk sheet, which protrudes concentrically around the piston rod along an outside of the third coupling hole, and a first auxiliary disk, an edge of which is mounted on the first auxiliary disk sheet; a first blow-off point formed on a bottom surface of the rebound retainer and formed in a contact portion between a first rebound disk sheet, which protrudes concentrically around the piston rod along an outside of the second coupling hole, and a first rebound disk, an edge of which is mounted on the first rebound disk sheet; a third blow-off point formed in a contact portion between a second auxiliary disk sheet, which protrudes from an edge of the auxiliary valve along an outside of the first auxiliary sheet, and a second auxiliary disk, an edge of which is mounted on the second auxiliary disk sheet; and a fourth blow-off point formed in a contact portion between a second rebound disk sheet, which protrudes from an edge of the rebound retainer along an outside of the first rebound disk sheet, and a second rebound disk, an edge of which is mounted on the second rebound disk sheet.

The piston rod may include: a first stepped portion which is formed to have an outer diameter smaller than a diameter of the piston rod and in which the compression retainer, the piston body, and the rebound retainer are sequentially disposed toward an end portion of the piston rod; a second stepped portion which is formed to have an outer diameter smaller than a diameter of the first stepped portion and extends from the first stepped portion and in which the auxiliary valve is disposed; and a communication groove which is formed by recessing an outer periphery of the first stepped portion toward the second stepped portion, such that the rebound passage and the third coupling hole communicate with each other to form the bypass passage.

A distance from the rebound retainer to an end edge of the second rebound disk sheet may be longer than a distance from the rebound retainer to an end edge of the first rebound disk sheet.

A distance from the auxiliary valve to an end edge of the second auxiliary disk sheet may be longer than a distance from the auxiliary valve to an end edge of the first auxiliary disk sheet.

The communication groove may be formed from an intersecting point of the bottom surface of the piston body and the outer periphery of the piston rod to an end of the first stepped portion from which the second stepped portion starts.

DETAILED DESCRIPTION OF EXEMPLARY EMBODIMENTS

Figure 1:
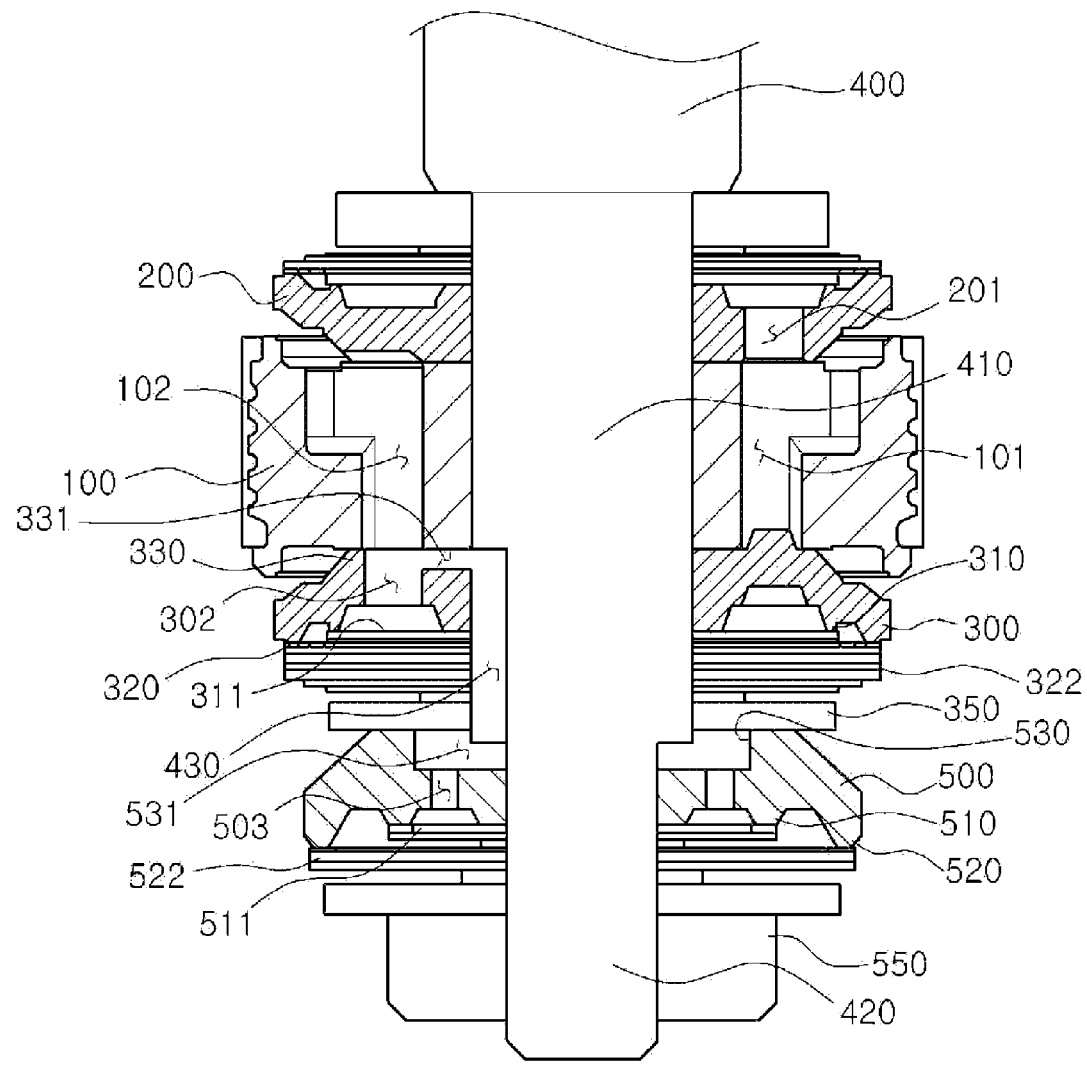
FIG. 1 is a cross-sectional conceptual diagram illustrating an overall configuration of a piston assembly of a shock absorber according to an embodiment of the present invention.

Exemplary embodiments of the present invention will be described below in detail with reference to the accompanying drawings. Throughout the disclosure, like reference numerals refer to like parts throughout the drawings and embodiments of the present invention.

Figure 2:
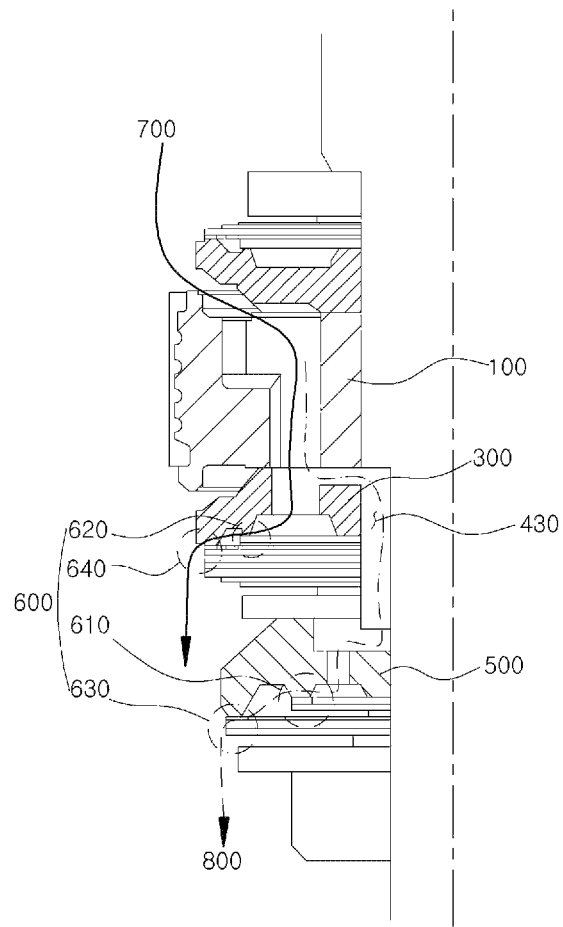
FIG. 2 is a partial cross-sectional conceptual diagram illustrating respective parts of a blow-off reducing unit, which is an essential component of the piston assembly of the shock absorber according to the embodiment of the present invention.

FIG. 1 is a cross-sectional conceptual diagram illustrating an overall configuration of a piston assembly for a shock absorber according to an embodiment of the present invention, and FIG. 2 is a partial cross-sectional conceptual diagram illustrating respective parts of a blow-off reducing unit, which is an essential component of the piston assembly of the shock absorber according to the embodiment of the present invention.

For reference, in FIG. 2, the same parts as those illustrated in FIG. 1 are not referred to again except as necessary for the understanding of the present invention. Reference numeral 550 in FIG. 1 represents a closing nut to be fixed to an end of a piston rod 400.

As illustrated in FIGS. 1 and 2, a compression retainer 200 and a rebound retainer 300 are disposed above and under a piston body 100, respectively. A blow-off reducing unit 600 forms a plurality of blow-off points, respectively, between the compression retainer 200 and an auxiliary valve 500 and on the bottom surface of the auxiliary valve 500. The blow-off reducing unit 600 is configured to considerably reduce a rapid variation in a damping force even in a low-speed and middle-speed transition period.

The piston rod 400 reciprocating within a cylinder penetrates the central portion of the piston body 100. A compression passage 101 and a rebound passage 102 alternately penetrating the piston body 100 are formed around the piston rod 400.

The compression retainer 200 is disposed above the piston body 100 and is penetrated by a first coupling hole 201 corresponding to the compression passage 101.

The rebound retainer 300 is disposed under the piston body 100 and is penetrated by a second coupling hole 302 corresponding to the rebound passage 102.

The auxiliary valve 500 is disposed under the rebound retainer 300 and is penetrated by a third coupling hole 503 which is connected from the rebound passage 102 through the outer periphery of the piston rod 400.

In addition, the blow-off reducing unit 600 is provided between the rebound retainer 300 and the auxiliary valve 500 and under the bottom surface of the auxiliary valve 500 to form the plurality of blow-off points.

That is, the blow-off reducing unit 600 forms the plurality of blow-off points by opening and closing a main passage 700, which is formed by mutual communication between the rebound passage 102 and the second coupling hole 302 during the rebound and compression strokes, and a bypass passage 800, which is separated from the main passage 700 and is formed by mutual communication with the third coupling hole 503 connected from the rebound passage 102 through the outer periphery of the piston rod 400.

According to the piston assembly as described above, the lack of a working fluid can be resolved by enabling the working fluid to move through the main passage 700 and the bypass passage 800 provided separately from the main passage 700. In addition, the blow-off in the low-speed and middle-speed transition period can be reduced by preventing the occurrence of pressure loss during the movement of the working fluid through an existing long bypass passage.

In addition to the above-described embodiment, the following various embodiments can also be applied to the present invention.

As described above, the compression retainer 200 is disposed above the piston body 100 and includes the first coupling hole 201 communicating with the compression passage 101 that is a flow path of the working fluid during the compression stroke.

On the other hand, as described above, the rebound retainer 300 is disposed under the piston body 100. As illustrated in FIGS. 1 and 2, a first rebound disk sheet 310 and a second rebound disk sheet 320 are formed concentrically on the bottom surface of the rebound retainer 300, and a mounting sheet 330 is formed on the top surface of the rebound retainer 300.

The first rebound disk sheet 310 is provided on the bottom surface of the rebound retainer 300 and protrudes concentrically around the piston rod 400 along the outside of the second coupling hole 302. An edge of a first rebound disk 311 is mounted on the first rebound disk sheet 310.

The second rebound disk sheet 320 protrudes from an edge of the rebound retainer 300 along the outside of the first rebound disk sheet 310. An edge of a second rebound disk 322 is mounted on the second rebound disk sheet 320.

The mounting sheet 330 is provided on the top surface of the rebound retainer 300. The mounting sheet 330 protrudes concentrically around the piston rod 400 along the outside of the second coupling hole 302, and comes into contact with the bottom surface of the piston body 100.

Therefore, a space 331 formed by the inside of the mounting sheet 330 may communicate with the main passage 700 and the bypass passage 800.

In this case, a distance from the rebound retainer 300 to an end edge of the second rebound disk sheet 320 may be longer than a distance from the rebound retainer 300 to an end edge of the first rebound disk sheet 310.

This may serve as technical means for forming points at which blow-off reduction occurs sequentially without affecting the formation of the respective blow-off points by the blow-off reducing unit 600 to be described below.

As described above, the auxiliary valve 500 is disposed under the rebound retainer 300. As illustrated in FIGS. 1 and 2, a first auxiliary disk sheet 510 and a second auxiliary disk sheet 520 are provided concentrically on the bottom surface of the auxiliary valve 500, and an auxiliary mounting sheet 530 is formed on the top surface of the auxiliary valve 500.

The first auxiliary disk sheet 510 is provided on the bottom surface of the auxiliary valve 500 and protrudes concentrically around the piston rod 400 along the outside of the third coupling hole 503. An edge of the first auxiliary disk 511 is mounted on first auxiliary disk sheet 510.

The second auxiliary disk sheet 520 protrudes from an edge of the auxiliary valve 500 along the outside of the first auxiliary disk sheet 510, and an edge of the second auxiliary disk 522 is mounted on the second auxiliary disk sheet 520.

The auxiliary mounting sheet 530 is provided on the top surface of the auxiliary valve 500. The auxiliary mounting sheet 530 protrudes concentrically around the piston rod 400 along the outside of the third coupling hole 503 and comes into contact with a bottom surface of a spacer 350 connected to the rebound retainer 300.

Therefore, the space 531 formed by the inside of the auxiliary mounting sheet 530 may communicate with the bypass passage 800.

In this case, a distance from the auxiliary valve 500 to an end edge of the second auxiliary disk sheet 520 may be longer than a distance from the auxiliary valve 500 to an end edge of the first auxiliary disk sheet 510.

This may serve as technical means for forming points at which blow-off reduction occurs sequentially without affecting the formation of the respective blow-off points by the blow-off reducing unit 600 to be described below.

As described above, the blow-off reducing unit 600 is provided between the rebound retainer 300 and the auxiliary valve 500 and on the bottom surface of the auxiliary valve 500 to form the plurality of blow-off points. The blow-off reducing unit 600 includes first, second, third, and fourth blow-off points 610, 620, 630, and 640 so as to resolve the degradation of the ride comfort which is caused by a rapid variation in a damping force.

The first blow-off point 610 is formed on the bottom surface of the auxiliary valve 500. Specifically, the first blow-off point 610 is formed in a contact portion between the first auxiliary disk sheet 510, which protrudes concentrically around the piston rod 400 along the outside of the third coupling hole 503, and the first auxiliary disk 511, the edge of which is mounted on the first auxiliary disk sheet 510.

The second blow-off point 620 is formed on the bottom surface of the rebound retainer 300. Specifically, the second blow-off point 620 is formed in a contact portion between the first rebound disk sheet 310, which protrudes concentrically around the piston rod 400 along the outside of the second coupling hole 302, and the first rebound disk 311, the edge of which is mounted on the first rebound disk sheet 310.

The third blow-off point 630 is formed in a contact portion between the second auxiliary disk sheet 520, which protrudes from the edge of the auxiliary valve 500 along the outside of the first auxiliary disk sheet 510, and the second auxiliary disk 522, the edge of which is mounted on the second auxiliary disk sheet 520.

The fourth blow-off point 640 is formed in a contact portion between the second rebound disk sheet 320, which protrudes from the edge of the rebound retainer 300 along the outside of the first rebound disk sheet 310, and the second rebound disk 322, the edge of which is mounted on the second rebound disk sheet 320.

Referring to FIG. 2, when the piston assembly of the shock absorber according to the embodiment of the present invention is in the rebound stroke, a plurality of blow-off points are formed by sequentially opening the passages from the first blow-off point 610 to the fourth blow-off point 640 while the working fluid is flowing through the main passage 700 indicated by a curved solid-line arrow and the bypass passage 800 indicated by a curved dotted-line arrow.

In this case, the bypass passage 800 has a length considerably shorter than that of a conventional bypass passage, which is provided separately so as to increase the number of blow-off points, by utilizing the outer periphery of the piston rod 400. Simultaneously, the bypass passage 800 minimizes pressure loss caused by flow distribution of the working fluid. In this manner, the bypass passage 800 increases the number of points at which blow-off occurs, and prevents a rapid variation in the damping force. As a result, the bypass passage 800 makes it possible to obtain soft and smooth transition in the damping force in the low-speed and middle-speed transition period (see portion C of FIG. 3).

On the other hand, the outer periphery of the piston rod 400 is utilized to from the above-described bypass passage 800. As a whole, the piston rod 400 may include a first stepped portion 410, a second stepped portion 420, and a communication groove 430.

Specifically, the first stepped portion 410 is formed to have an outer diameter smaller than a diameter of the piston rod 400 and provides a space in which the compression retainer 200, the piston body 100, and the rebound retainer 300 are sequentially disposed toward the end portion of the piston rod 400.

The second stepped portion 420 is formed to have an outer diameter smaller than a diameter of the first stepped portion 410, extends from the first stepped portion 410, and provides a space in which the auxiliary valve 500 is disposed.

In addition, the communication groove 430 is formed by recessing the outer periphery of the first stepped portion 410 toward the second stepped portion 420, such that the rebound passage 102 and the third coupling hole 503 communicate with each other to form the bypass passage 800.

Therefore, the communication groove 430 may be formed from an intersecting point of the bottom surface of the piston body 100 and the outer periphery of the piston rod 400 to the end of the first stepped portion 410 from which the second stepped portion 420 starts.

Figure 3:
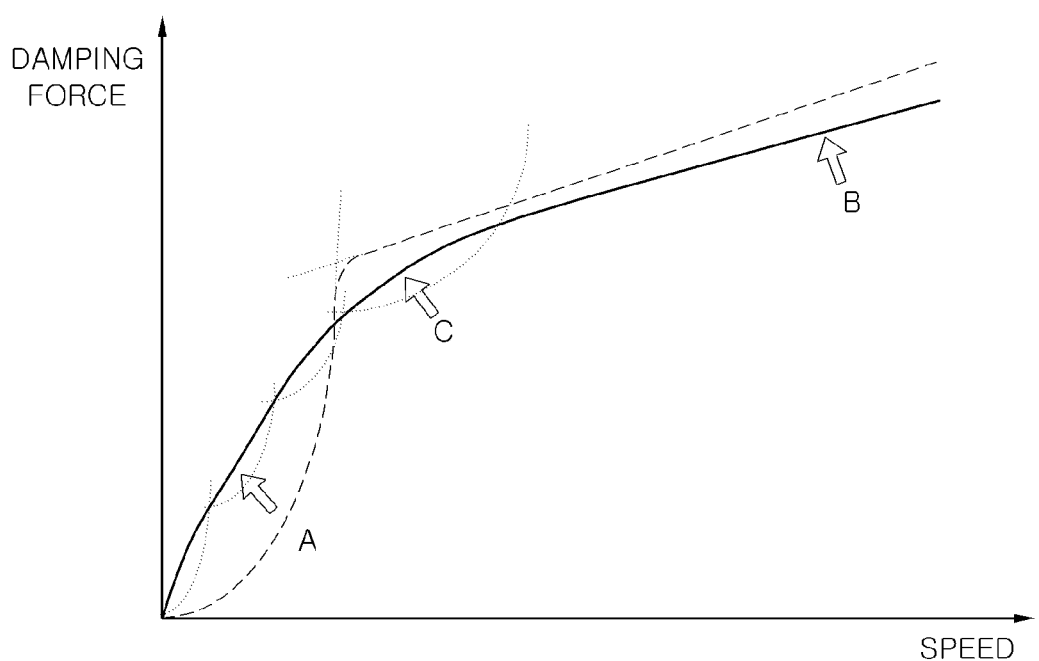
FIG. 3 is a graph showing comparison between a damping force characteristic of the piston assembly of the shock absorber according to the embodiment of the present invention and a damping force characteristic of a conventional piston assembly.

FIG. 3 illustrates characteristic curves obtained as a result of comparison and analysis of the damping force in the conventional piston assembly and the damping force in the piston assembly of the shock absorber according to the above embodiments of the present invention.

For reference, in FIG. 3, a curve indicated by a solid line represents the characteristic curve of the damping force in the piston assembly of the shock absorber, and a curve indicated by a dotted line represents the characteristic curve of the damping force in the conventional piston assembly.

In this case, period A represents a low-speed driving period, period B represents a middle-speed driving period, and period C represents a low-speed and middle-speed transition period.

Since blow-off occurs at one point in the conventional piston assembly as illustrated in FIG. 3, a rapid variation occurs in the damping force, resulting in degradation in a ride comfort.

On the contrary, in the piston assembly of the shock absorber according to the embodiment of the present invention, blow-off occurs at four points, that is, the first, second, third and fourth blow-off points 610, 620, 630 and 640 formed by the blow-off reducing unit 600, resulting in smooth and soft variation in the damping force as indicated by period C of FIG. 3.

Accordingly, the piston assembly of the shock absorber according to the present invention can considerably reduce factors which cause a passenger to feel uncomfortable, as compared to the conventional piston assembly.

As described above, the basic technical spirit of the present invention is to provide the piston assembly of the shock absorber which can easily control the damping force in the low-speed and middle-speed transition period.

According to the piston assembly of the shock absorber as described above, the blow-off reducing unit is provided between the extension retainer and the auxiliary valve and on the bottom surface of the auxiliary valve, so that the working fluid can be distributed and transferred to the main passage and the bypass passage. In addition, the plurality of blow-off points is formed, leading to easy control of the damping force in the low-speed and middle-speed transition period. Therefore, soft and smooth damping force characteristics can be obtained in the low-speed and middle-speed transition period, leading to comfortable ride for passengers.

While the embodiments of the present invention have been described with reference to the specific embodiments, it will be apparent to those skilled in the art that various changes and modifications may be made without departing from the spirit and scope of the invention as defined in the following claims.

| REFERENCE SIGNS LIST | |
|---|---|
| 100: piston body | 200: compression retainer |
| 300: rebound retainer | 400: piston rod |
| 500: auxiliary valve | 600: blow-off reducing unit |

What is claimed is:

1. A piston assembly of a shock absorber, comprising:
a piston body in which a piston rod reciprocating within a cylinder penetrates a central portion thereof, and a compression passage and a rebound passage alternately penetrating the piston body are formed around the piston rod;
a compression retainer disposed above the piston body and penetrated by a first coupling hole corresponding to the compression passage;
a rebound retainer disposed under the piston body and penetrated by a second coupling hole corresponding to the rebound passage;
an auxiliary valve disposed under the rebound retainer and having a third coupling hole connected from the rebound passage through an outer periphery of the piston rod; and
a blow-off reducing unit provided between the rebound retainer and the auxiliary valve and under the auxiliary valve, and configured to form a plurality of blow-off points by opening and closing a main passage, which is formed by mutual communication between the rebound passage and the second coupling hole during rebound and compression strokes, and a bypass passage, which is separated from the main passage and is formed by mutual communication with the third coupling hole connected from the rebound passage through the outer periphery of the piston rod,
wherein the piston rod comprises:
a first stepped portion which is formed to have an outer diameter smaller than a diameter of the piston rod and in which the compression retainer, the piston body, and the rebound retainer are sequentially disposed toward an end portion of the piston rod;
a second stepped portion which is formed to have an outer diameter smaller than a diameter of the first stepped portion and extends from the first stepped portion and in which the auxiliary valve is disposed; and
a communication groove which is formed by recessing an outer periphery of the first stepped portion toward the second stepped portion, such that the rebound passage and the third coupling hole communicate with each other to form the bypass passage.

2. The piston assembly according to claim 1, further comprising:
a first rebound disk sheet formed on a bottom surface of the rebound retainer and protruding concentrically around the piston rod along an outside of the second coupling hole, an edge of a first rebound disk being mounted on the first rebound disk sheet;
a second rebound disk sheet protruding from an edge of the rebound retainer along an outside of the first rebound disk sheet, an edge of a second rebound disk being mounted on the second the second rebound disk sheet; and
a mounting sheet formed in the rebound retainer, protruding concentrically around the piston rod along an outside of the second coupling hole, and coming into contact with a bottom surface of the piston body,
wherein a space formed by an inside of the mounting sheet communicates with the main passage and the bypass passage respectively.

3. The piston assembly according to claim 1, further comprising:
a first auxiliary disk sheet formed on a bottom surface of the auxiliary valve and protruding concentrically around the piston rod along an outside of the third coupling hole, an edge of a first auxiliary disk being mounted on the first auxiliary disk sheet;
a second auxiliary disk sheet protruding from an edge of the auxiliary valve along an outside of the first auxiliary disk sheet, an edge of a second auxiliary disk being mounted on the second auxiliary disk sheet; and
an auxiliary mounting sheet formed on a top surface of the auxiliary valve, protruding concentrically around the piston rod along an outside of the third coupling hole, and coming into contact with a bottom surface of a spacer connected to the rebound retainer,
wherein a space formed by an inside of the auxiliary mounting sheet communicates with the bypass passage.

4. The piston assembly according to claim 1, wherein the blow-off reducing unit comprises:

a first blow-off point formed on a bottom surface of the auxiliary valve and formed in a contact portion between a first auxiliary disk sheet, which protrudes concentrically around the piston rod along an outside of the third coupling hole, and a first auxiliary disk, an edge of which is mounted on the first auxiliary disk sheet;

a second blow-off point formed on a bottom surface of the rebound retainer and formed in a contact portion between a first rebound disk sheet, which protrudes concentrically around the piston rod along an outside of the second coupling hole, and a first rebound disk, an edge of which is mounted on the first rebound disk sheet;

a third blow-off point formed in a contact portion between a second auxiliary disk sheet, which protrudes from an edge of the auxiliary valve along an outside of the first auxiliary sheet, and a second auxiliary disk, an edge of which is mounted on the second auxiliary disk sheet; and a fourth blow-off point formed in a contact portion between a second rebound disk sheet, which protrudes from an edge of the rebound retainer along an outside of the first rebound disk sheet, and a second rebound disk, an edge of which is mounted on the second rebound disk sheet.

5. The piston assembly according to claim 2, wherein a distance from an upper part of the rebound retainer to an end edge of the second rebound disk sheet is longer than a distance from the upper part of the rebound retainer to an end edge of the first rebound disk sheet.

6. The piston assembly according to claim 3, wherein a distance from an upper part of the auxiliary valve to an end edge of the second auxiliary disk sheet is longer than a distance from the upper part of the auxiliary valve to an end edge of the first auxiliary disk sheet.

7. The piston assembly according to claim 1, wherein the communication groove is formed from an intersecting point of the bottom surface of the piston body and the outer periphery of the piston rod to an end of the first stepped portion from which the second stepped portion starts.

8. The piston assembly according to claim 3, wherein the rebound retainer is disposed at an upper side of the spacer and the auxiliary valve is disposed at a lower side of the spacer, such that the auxiliary valve is separated from the rebound retainer.

* * * * *